(12) United States Patent
Numata

(10) Patent No.: US 6,803,968 B1
(45) Date of Patent: Oct. 12, 2004

(54) SYSTEM AND METHOD FOR SYNTHESIZING IMAGES

(75) Inventor: Kohji Numata, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/547,080

(22) Filed: Apr. 11, 2000

(30) Foreign Application Priority Data

Apr. 20, 1999 (JP) .......................................... 11-111587

(51) Int. Cl.[7] .............................................. H04N 9/74
(52) U.S. Cl. ...................... 348/584; 348/565; 348/589; 348/598; 348/600
(58) Field of Search ................................ 348/584, 586, 348/587, 589, 590, 598, 600, 563, 564, 565, 591, 592; 345/435, 428, 432; H04N 9/74

(56) References Cited

U.S. PATENT DOCUMENTS

| | | | | |
|---|---|---|---|---|
| 4,682,297 A | * | 7/1987 | Iwami | 348/587 |
| 5,500,684 A | * | 3/1996 | Uya | 348/586 |
| 5,625,764 A | * | 4/1997 | Tsujimoto et al. | 395/135 |
| 5,831,604 A | * | 11/1998 | Gerber | 345/199 |
| 6,023,302 A | * | 2/2000 | MacInnis et al. | 348/586 |
| 6,208,350 B1 | * | 3/2001 | Herrera | 345/430 |
| 6,359,657 B1 | * | 3/2002 | Westerink et al. | 348/584 |

* cited by examiner

Primary Examiner—Michael H. Lee
Assistant Examiner—Trang U. Tran
(74) Attorney, Agent, or Firm—Foley & Lardner LLP (57) ABSTRACT

An image synthesizing system is provided that can prevent image deterioration resulting from synthesis applied to a predictive image to be used for the next frame. The image synthesizing system decodes and synthesizes a main frame and a sub-image compressed in different modes. The image synthesizing system includes a main image frame buffer 122, an alpha blending section 133, and an image synthesis and display 140. The main image frame buffer 122 stores a main image to be referred to in the next frame decoding process. The alpha blending section 133 alpha-blends a main image from the main image frame buffer with a decoded sub-image to produce a translucent composite image. The image synthesis and display 140 superimposes the translucent composite image on the main image.

12 Claims, 7 Drawing Sheets

SYSTEM AND METHOD FOR SYNTHESIZING IMAGES

BACKGROUND OF THE INVENTION

The present invention relates to an image synthesizing system or method. More particularly, the present invention is related to an image synthesizing system or method wherein a main image compressed in a MPEG (Moving Picture Expert Group) mode is decoded and then the decoded main image is synthesized with a sub-image compressed in a run-length mode.

Figure 8:
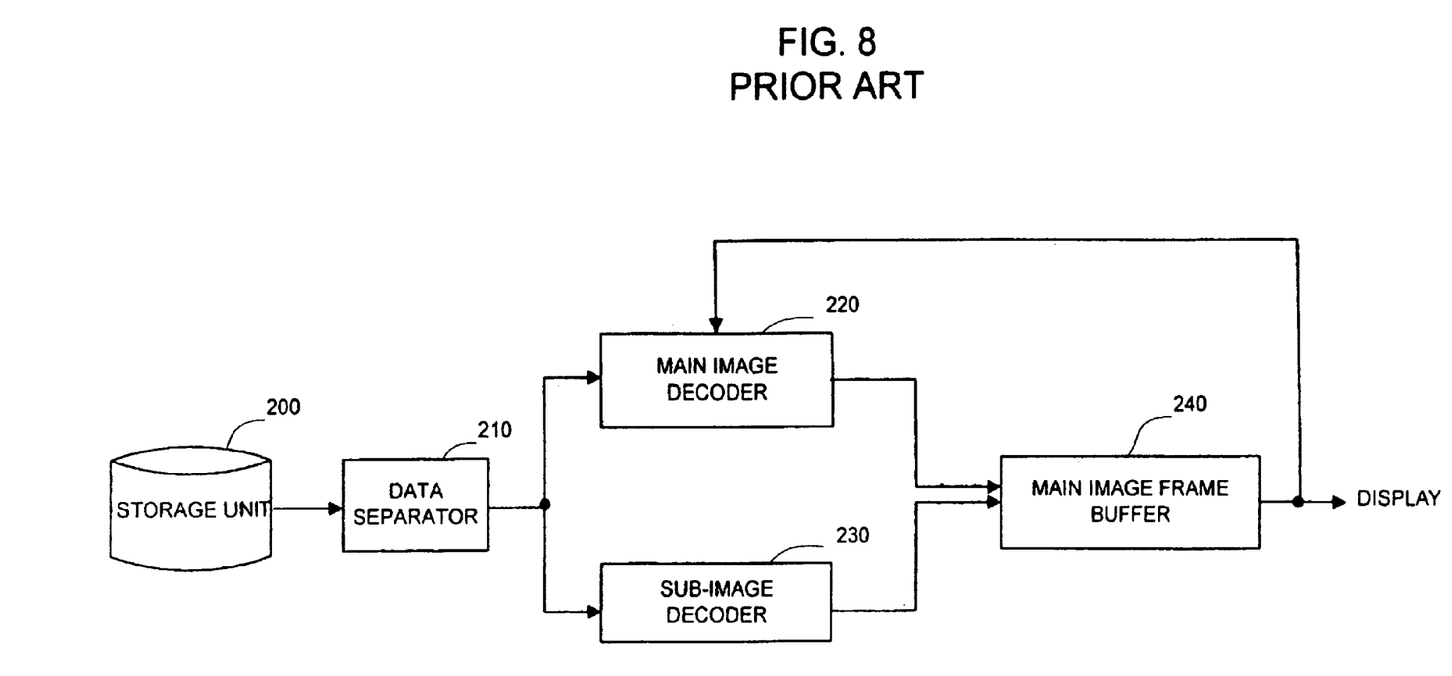
FIG. 8 is a diagram illustrating a conventional image synthesizing system.

FIG. 8 illustrates a conventional image synthesizing system. Referring to FIG. 8, a storage unit 200 stores multiple data, including main image data compressed and decoded in the MPEG mode, and sub-image data compressed and decoded in the run-length mode and representing still images such as movie or karaoke subtitles The storage unit 200 is connected to a data separator 210. The data separator 210 separates compressed main image data and compressed sub-image data each read out of the storage unit 200.

The data separator 210 is connected to a main image decoder 220 and to a sub-image decoder 230. The main image decoder 220 receives compressed main image data from the data separator 210. The sub-image decoder 230 receives compressed sub-image data from the data separator 210.

The main image decoder 220 decodes image data compressed and encoded in the MPEG mode.

The sub-image decoder 230 decodes sub-image data compressed and encoded in the run-length mode.

A main image frame buffer 240 is connected to the main image decoder 220. The main image frame buffer 240 is a frame memory that stores previous frame images from the main image decoder 220. Content is taken out of the frame buffer in accordance with motion position information. A predictive error is added to the content to obtain a reconstructed image. The reconstructed image is stored in the frame buffer to use as a predictive image for the next frame.

The main image frame buffer 240 alpha-blends the image reconstructed by the main image decoder 220 with the reconstructed image decoded by the sub-image decoder 230.

However, the above-mentioned image synthesizing system suffers from image deterioration because a predictive image to be used for the next frame by the main image decoder 220 has already been subjected to a synthesizing process.

In the above explanation, the decoding process of each of the main image decoder 220 and the sub-image decoder 230 and the synthesizing process are performed by software. In some cases, decoding functions may be performed by signal processing hardware. However, there remains the problem that a personal computer cannot perform the alpha blending process because the burden on the main frame buffer 240 is heavy when sub-images are written at video clock rates.

SUMMARY OF THE INVENTION

The present invention is made to solve the above-mentioned problems.

Moreover, the objective of the invention is to provide an image synthesizing system that can synthesize a main image obtained in an MPEG decoding process with a sub-image obtained in a run-length decoding process, without image deterioration, and can relieve the burden on the frame buffer in the synthesizing operation.

Another object of the present invention is to provide an image synthesizing system that can synthesize a main image obtained in an MPEG decoding process with a sub-image obtained in a run-length decoding process, without image deterioration, and can relieve the burden on the frame buffer of performing the synthesizing operation.

The objective of the present invention is achieved by an image synthesizing system, in which frames of a main image and a sub-image, that are compressed in different modes are decoded and synthesized. The system comprises a main image frame buffer for storing the main image to be decoded and referred to in the next frame decoding process. An alpha blending section alpha-blends a main image from the main image frame buffer with a decoded sub-image to produce a translucent composite image. Then, an image synthesis and display section superimposes the translucent composite image produced by the alpha blending section on the main image.

Preferably, the main image is compressed in MPEG (Moving Picture coding Experts Group) mode and the sub-image is compressed in a run-length mode.

The above configuration allows the main image frame buffer to be used as a reference in the decoding process, thus preventing deterioration of images. Conventionally, MPEG images are decoded with reference to the next frame and the preceding frame. According to the present invention, the main image frame buffer 122 is used for storing reference frames and is not used for the alpha-blending operation.

Preferably, the alpha blending section alpha-blends the sub-image with a section of the main image to produce a translucent composite image. Each pixel of the sub-image is blended with a corresponding pixel of the main image in accordance with a ratio represented by the pixel data of the sub-image. The alpha-blending section uses a color table having colors designated by index values, and represents each pixel of the composite image with an index value. An image synthesis and display section superimposes the translucent composite image on the corresponding main image from the main image frame buffer, without performing the alpha blending operation. This means that the burden for processing is light.

Preferably, the sub-image is a still image, such as movie or karaoke subtitles. The sub-image size is small enough for the translucent image synthesis to be performed by the alpha blending section 133. Since small sub-images such as subtitles require a small amount of processing and the alpha blending section 133 performs calculations only for the translucent pixels of the sub-image, no calculation is needed for pixels other than those to which the sub-image is applied translucently. The image synthesis and display section does not require special hardware or a high clock rate and merely performs a superimposing operation. Therefore, personal computers can be utilized for this function.

Moreover, according to the present invention, an image synthesizing system decodes and synthesizes a main image and a sub-image that are compressed in different modes. The system includes a main image decoder for decoding a main image and a main image frame buffer for storing main images decoded by the main image decoder and referred to in decoding of subsequent frames. A sub-image decoder decodes sub-images, and a sub-image frame buffer stores sub-image frames decoded by the sub-image decoder. An alpha blending section alpha-blends the main image frame from the main image frame buffer with the sub-image frame from the sub-image frame buffer to produce a translucent composite image. A composite image frame buffer stores the composite image synthesized by the alpha blending section, and an image synthesis and display section superimposes the translucent composite image on the main image from the main image frame buffer.

The above configuration allows the main image frame buffer to be used as a reference in the decoding process. Hence, the image deterioration can be prevented and the functions can be performed on a personal computer.

Furthermore, in an image synthesis method according to the present invention, a main image and a sub-image that are compressed in different modes are decoded and synthesized. A main image from a main image frame buffer is alpha-blended with a decoded sub-image to produce a translucent composite image. The translucent composite image is then superimposed on the main image.

The above method allows the main image frame buffer to be used as a reference in the decoding process. As a result, the image deterioration can be prevented and the functions can be performed by a personal computer.

Preferably, the main image is compressed in the MPEG mode and the sub-image is compressed in the run-length mode.

The alpha blending step is preferably executed for a part of the main image that is the size of the sub-image.

Moreover, it is desirable that alpha blending comprises synthesizing pixels of the sub-image with corresponding pixels of the main image in accordance with a ratio represented by the data of the pixel of the sub-image. The pixels of the composite image is preferably represented by index values corresponding to colors in a color table.

DESCRIPTION OF THE DRAWINGS

This and other objects, features, and advantages of the present invention will become more apparent upon a reading of the following detailed description and drawings, in which.

DESCRIPTION OF THE EMBODIMENTS

An image synthesizing system of the present invention will be described below in detail with reference to the attached drawings.

Figure 1:
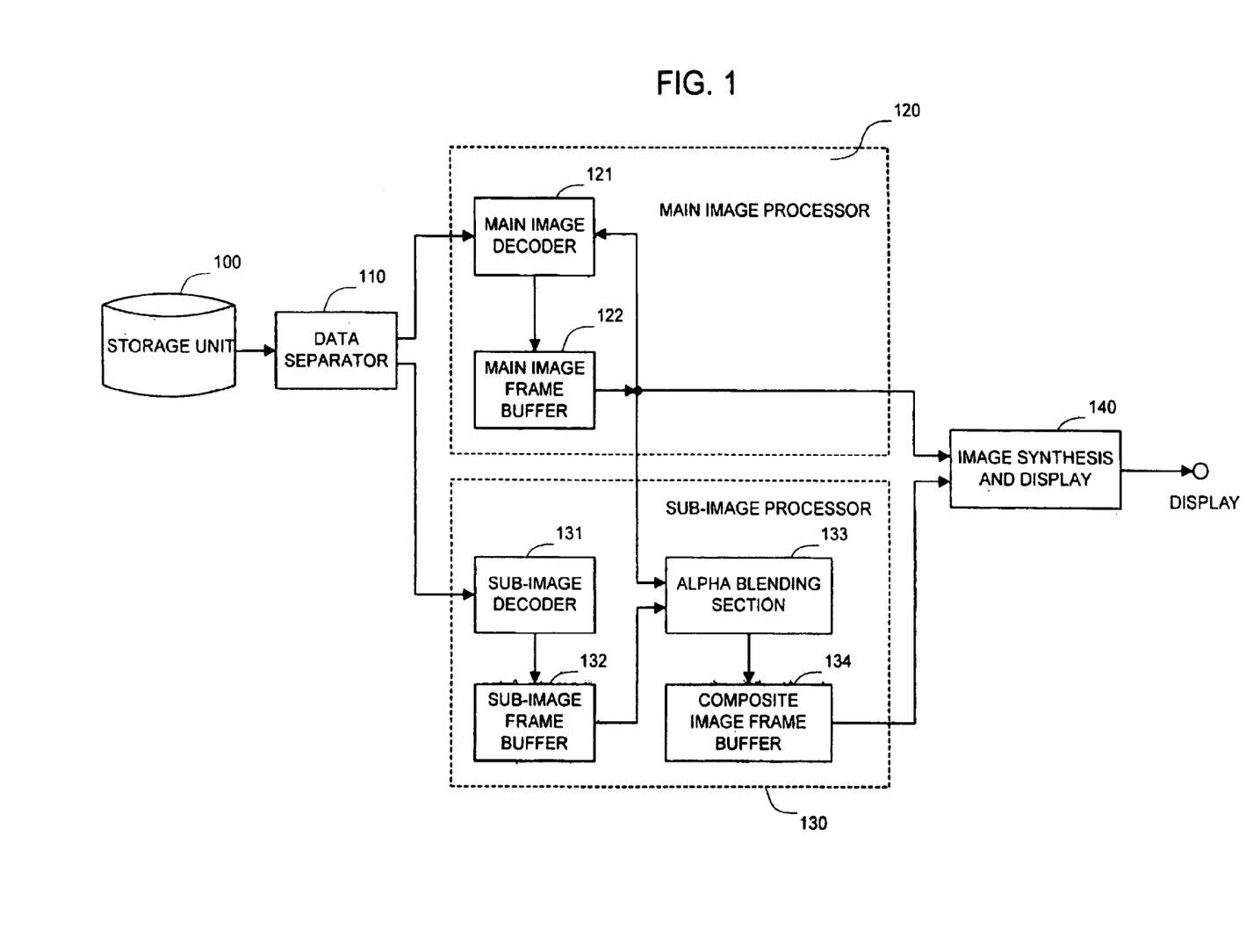
FIG. 1 is a block diagram schematically illustrating the configuration of an image synthesizing system according to an embodiment of the present invention.

FIG. 1 is a block diagram schematically illustrating the configuration of an image synthesizing system according to an embodiment of the present invention. Referring to FIG. 1, a storage unit 100 stores main image data compressed and encoded in the MPEG mode, and sub-image data regarding still images such as movie or karaoke subtitles that are compressed and encoded in run-length mode.

The storage unit 100 is connected to a data separator 110. The data separator 110 separates compressed main image data and compressed sub-image data from multiple data read out of the storage unit 100.

The data separator 110 is connected to a main image processor 120. The main image processor 120 receives compressed main image data from the data separator 110. The main image processor 120 includes a main image decoder 121 that decodes main image data compressed and encoded in the MPEG mode and a main image frame buffer 122 connected to the main image decoder 121. The main image frame buffer 122 is a frame memory that stores previous frame images output from the main image decoder 121. Content is taken out of the frame buffer in accordance with motion position information. A predictive error is added to obtain a reconstructed image of the main image. The reconstructed image is stored into the frame memory to be used a predictive image for the next frame.

A sub-image decoder 131 is also connected to the data separator 110. The sub-image decoder 131 receives run length encoded sub-image data from the data separator 110 and then decodes it to produce image data representing still images such as movie or karaoke subtitles. A sub-image frame buffer 132 connected to the sub-image decoder 131 stores sub-image data decoded by the sub-image decoder 131.

An alpha blending section 133 alpha-blends main image data with a length of L0 pixels and a height of H0 pixels from the main image frame buffer 122 with sub-image data having a length of L1 pixels and a height of H1 pixels, where L0>L1 and H0>H1, from the sub-image frame buffer 132.

The alpha blending section 133 is connected to a composite image frame buffer 134. The composite image frame buffer 134 stores images synthesized by the alpha blending section 133.

An image synthesis and display section 140 superimposes the composite image data from the composite image frame buffer 134 on the main image data from the main image frame buffer 122, and displays the resulting image in which the sub-image is translucently applied to a section of the main image.

Figure 2:
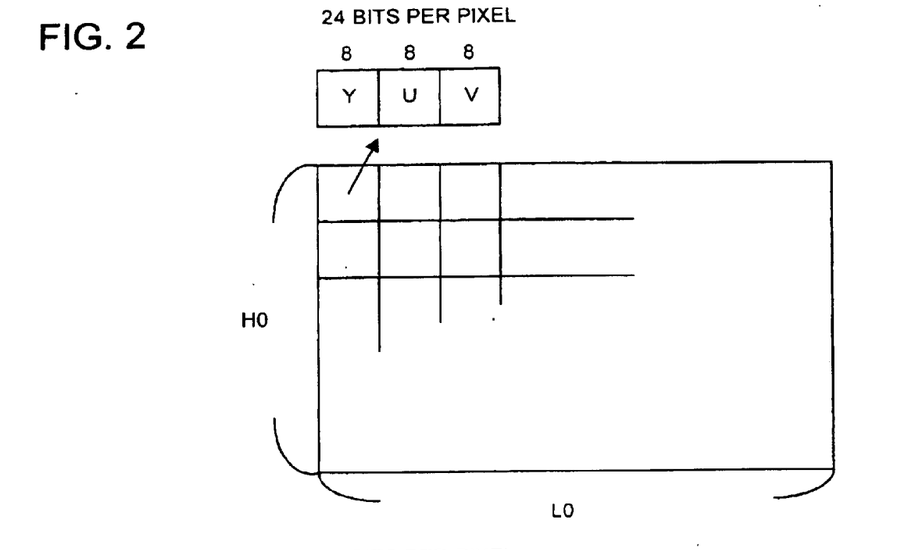
FIG. 2 is a diagram explaining the data format in the main image frame buffer 122.

FIG. 2 is a diagram explaining the data format of images in the main image frame buffer 122. Referring to FIG. 2, the image data format decoded by the main image decoder 121 and stored in the main frame buffer 122 represents each pixel with 24-bit YUV data. The 24-bit YUV data is formed of 8 bits corresponding to a brightness signal Y, 8 bits corresponding to a (R−Y) color-difference signal, and 8 bits corresponding to a (B−Y) color-difference signal, where R represents red and B represents blue. The main image has a length of L0 pixels and a height of H0 pixels.

Figure 3A:
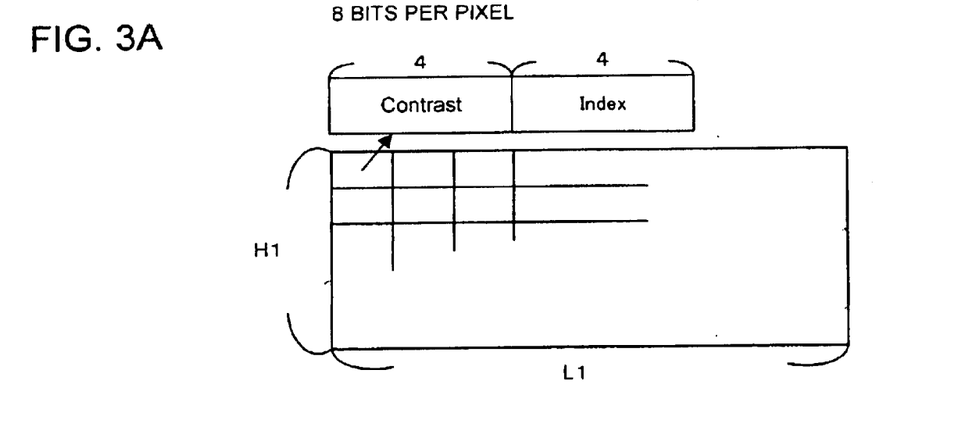
FIG. 3A is a diagram explaining the data format in the sub-image frame buffer 132.

FIG. 3 is a diagram explaining a data format in the sub-image frame buffer 132. The data format stored in the sub-image frame buffer 132, as shown in FIG. 3(a), is 8-bit sub-image frame data which is formed of a 4-bit color index value of 0 to 15 and a 4-bit contrast value of 0 to 15. The sub-image has a length of L1 pixels and a height of H1 pixels.

The contrast value represents a ratio of the sub-image pixel relative to the corresponding pixel of the main image.

The contrast value 0 represents transparency. The contrast value 15 represents non-transparency. The contrast values 1 to 14 represent translucency.

Figure 3B:
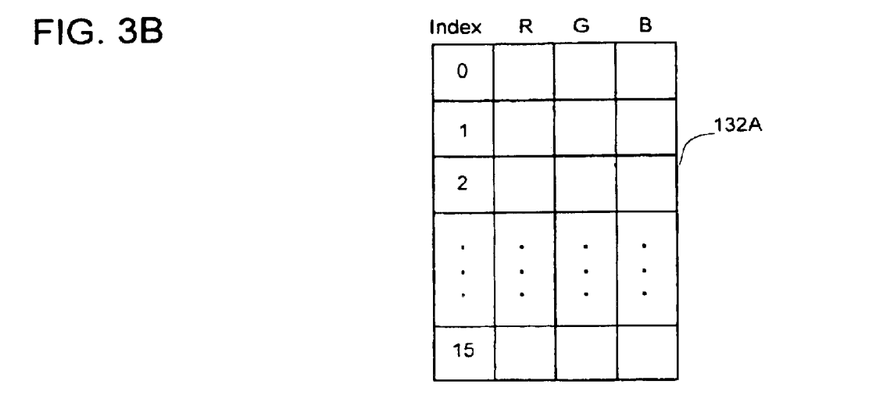
FIG. 3B is a diagram explaining the data format in the sub-image frame buffer 132.

The sub-image frame buffer 132 has a sub-image color table 132A, as shown in FIG. 3(b). The sub-image color table 132A is used to access groups of an 8-bit red (R) color value, an 8-bit green (G) color value, and an 8-bit blue (B) color value, each group being associated with a 4 bit index value.

Figure 4:
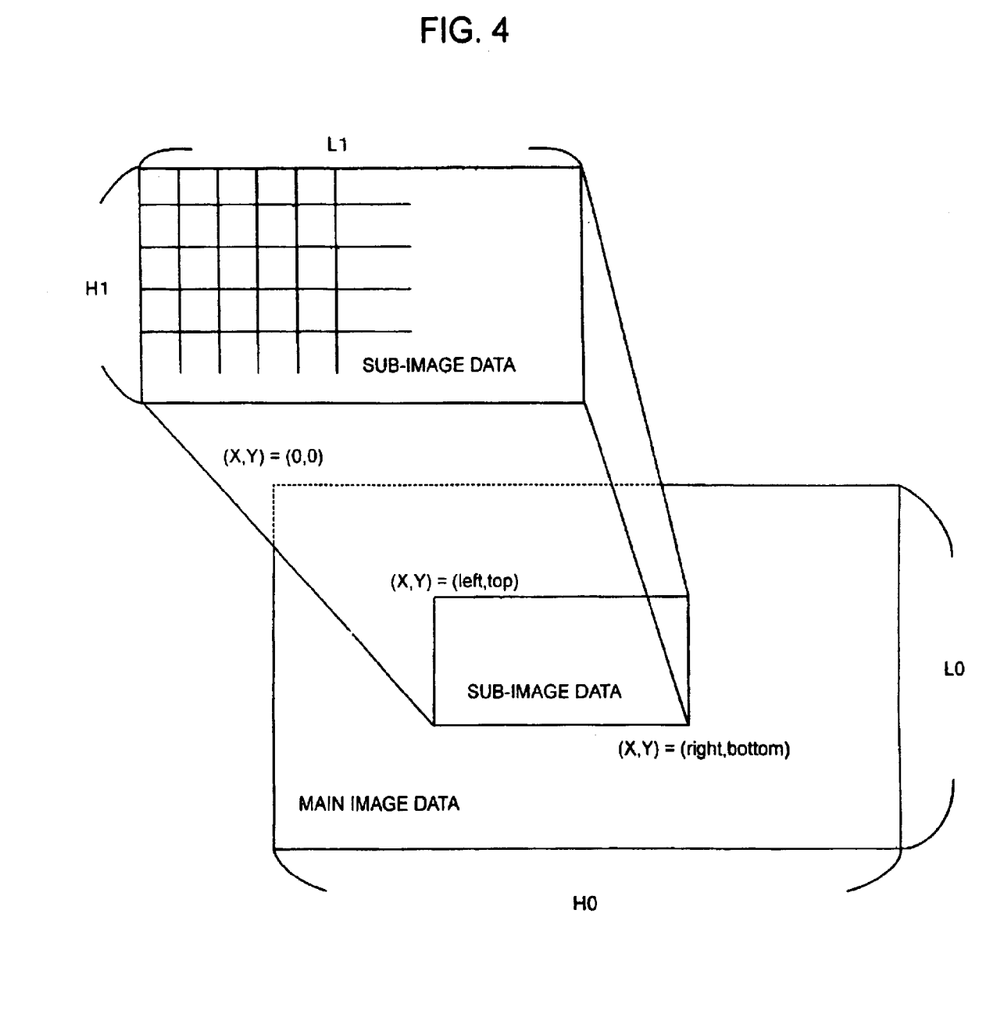
FIG. 4 is a diagram explaining synthetic locations of the alpha blending section 133.

FIG. 4 is a diagram explaining positioning of the sub-image in the alpha blending section 133. The alpha blending section 133 obtains data for the X and Y coordinates of the section of the main image data within the main image frame buffer 122 corresponding to the position of the sub-image. Coordinates for the top left and the lower right corners of the sub-image are captured from the sub-image data in the sub-image frame buffer 132.

Figure 5A:
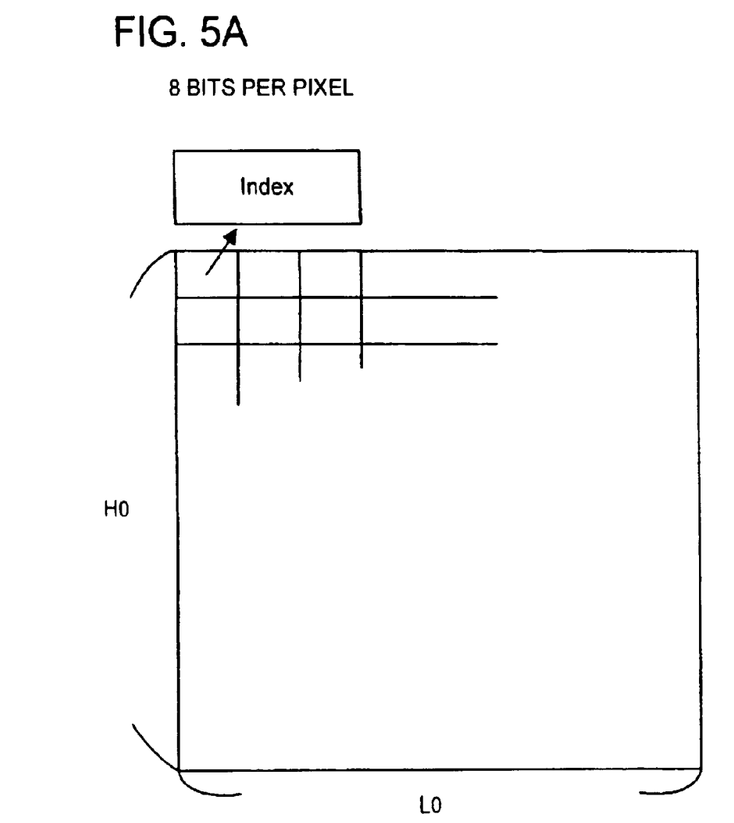
FIG. 5A is a diagram explaining the data format in the composite image frame buffer 134.
Figure 5B:
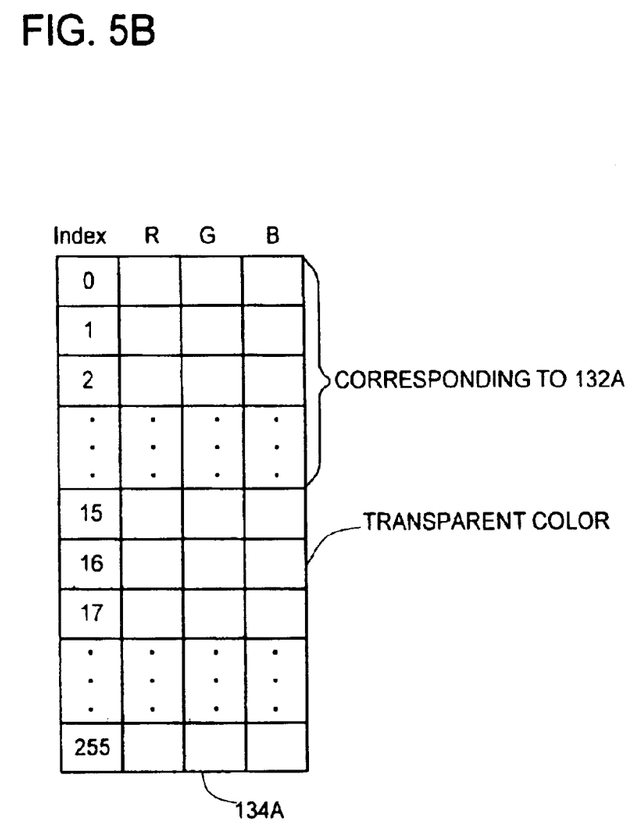
FIG. 5B is a diagram explaining the data format in the composite image frame buffer 134.

Each of FIGS. 5(A) and 5(B) is a diagram explaining the data format in the composite image frame buffer 134. Referring to FIG. 5(A), the data in the composite image frame buffer 134 uses an 8-bit color table index format. The composite image is the same size as the main image.

The composite image frame buffer 134, as shown in FIG. 5(B), also stores a composite image color table 134A for accessing 8-bit R, G, and B color data groups using an 8-bit index.

The image synthesis and display 140 determines that a pixel value of 16 in the composite image is transparent and so uses the corresponding pixel from the main image frame buffer in the final image. Pixels having an index value other than 16 use colors corresponding to their 8 bit values at corresponding locations in the final image.

Figure 6:
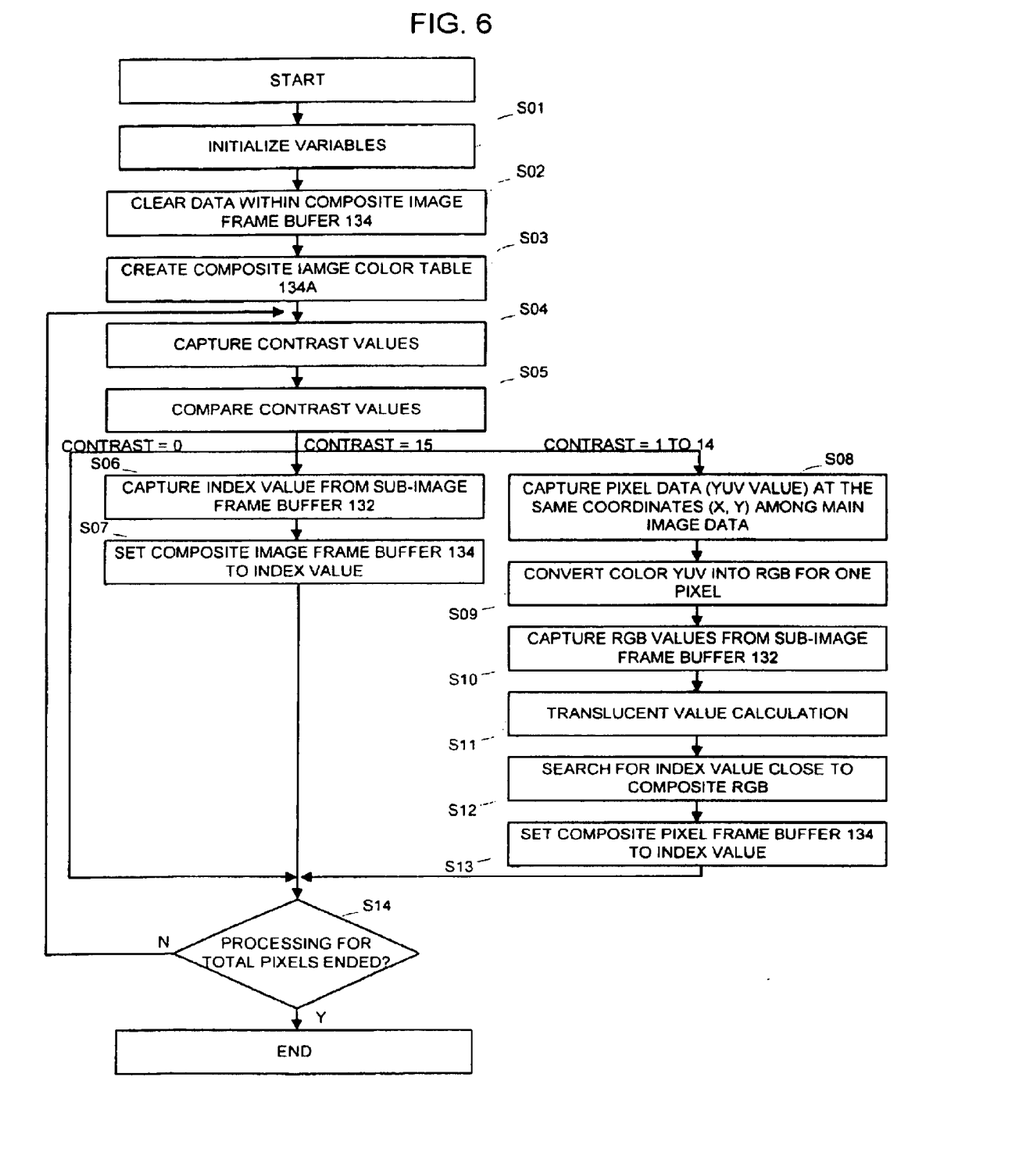
FIG. 6 a flowchart of a processing operation of the alpha blending section 133.

FIG. 6 is a flowchart showing the operational process of the alpha blending section 133. Referring to FIG. 6, an alpha blending process is initialized in the steps S0I to S03.

Specifically, variables to be used are initialized in the step S0I. In the step S02, data held in the composite image frame buffer 134 is set to the same image size (e.g., L0 pixels×H0 pixels) as that in the main image frame buffer 122. The composite image is initialized to pixel values of 16 (transparent color) to clear the existing data.

In the step S03, the composite image frame buffer 134 creates the composite image color table 134A. In this case, it is assumed that the R, G, and B data corresponding to the indexes 0–15 in the composite image color table 134A are the same as those corresponding to the indexes 0–15 in the sub-image color table 132A. The index 16 specifies a transparent color. R, G, and B values corresponding to the indexes 17 to 255 are suitably set to values between 0 and 255.

In the steps S04, the contrast value of an image at given X and Y coordinates is captured from the sub-image frame buffer 132. As shown in FIG. 4, each of positions corresponding to the main image data is indicated by X and Y coordinates. The synthesis of the main image data and the sub-image data starts at the top left and ends at the bottom right of the sub-image.

In the steps S05, the captured contrast values are compared with the reference values 0 and 15. When the captured contrast value is 0, it represents to be transparent. The flow goes to the step S14, without setting the data to zero.

In the step S06, when the captured contrast value is 15, it represents no transparency. The indexes for sub-image pixels are captured from the sub-image frame buffer 132.

In the steps S07, an index is set to a corresponding location in the composite image frame buffer 134.

In the steps S08 to S13, when the captured contrast value is 1 to 14, calculation is executed to produce a translucent pixel.

In the step S08, image data at the corresponding X and Y coordinates is captured from the main image frame buffer 122.

In the step S09, the image data obtained in the step S08, formed of 8-bit Y data, 8-bit U data, and 8-bit V data, are converted into 8-bit R data, 8-bit G data, and 8-bit B data.

In the step S10, data R, G, and B are captured from the sub-image frame buffer 132 by referring to the sub-image color table 132A using the index stored at the same X and Y coordinates in the sub-image.

In the step S11, the color data R, G, and B captured in the step S10 are synthesized with the values R, G, and B converted in the step S09. Where the contrast has any of 16 values ranging from a contrast value of 0 to a contrast value of 15, the alpha blending of the main image pixel and the sub-image pixel is made according to the following formulas:

$$R3=(k \times R1+(16-k) \times R2 \div 16$$

$$G3=(k \times G1+(16-k) \times G2 \div 16$$

$$B3=(k \times B1+(16-k) \times B2 \div 16$$

where k=a contrast value+1; R1, G1, or B1 represents the color data of the sub-image pixel; R2, G2, or B2 represents the color data of the main image pixel; and R3, G3, or B3 represents the color data of the resulting composite image pixel.

In the step S12, R, G, and B values on the composite image color table 134A are compared with the composite R, G and B values, respectively, to search for the index for the closest R, G, or B value.

In the step S13, the closest index determined by the search is used as the value for the pixel in the composite image frame buffer 134.

In the step S14, to process all pixels for a sub-image in the steps S04 to S13, the X-coordinates and the Y-coordinates are updated and it is judged whether all pixels have been processed. If the process is not ended, the flow goes back to the step S04. Otherwise, the alpha blending process is ended.

Figure 7:
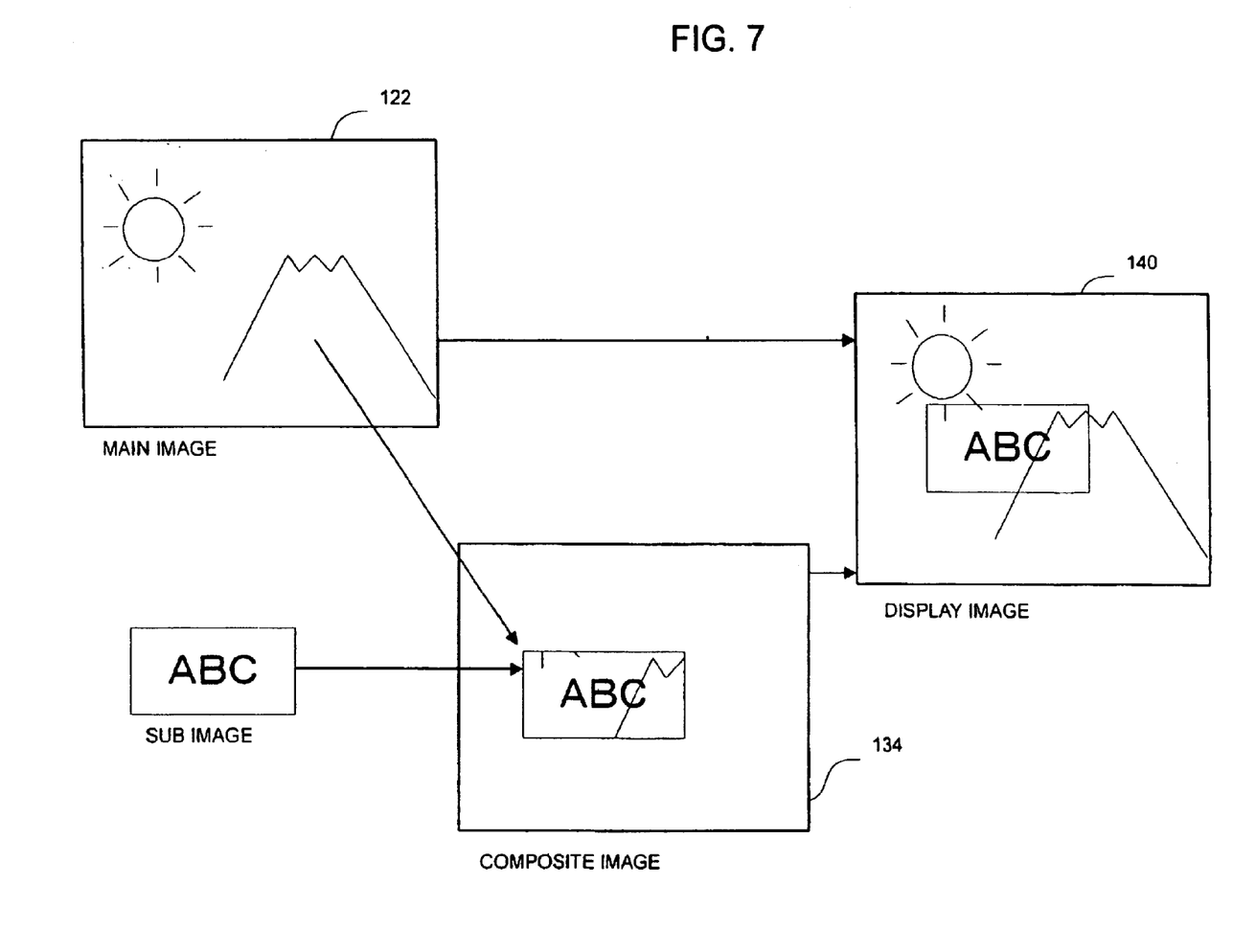
FIG. 7 is a diagram explaining a screen display of the image synthesis and display 140.

FIG. 7 is a diagram illustrating the displaying of the image synthesis and display 140. Referring to FIG. 7, the image in the main image frame buffer 122 and the image in the composite image frame buffer 134 are displayed in a superimposed mode. Pixels of the composite image having an index of 16 are not displayed, rather, corresponding pixels of the main image are displayed. For composite image pixels having an index other than 16, the composite image pixel is used.

The image synthesizing methods employing the data formats shown in FIGS. 2, 3, and 5 have been explained above. However, it should be noted that the present invention is not limited to the above data formats. The data format in each frame buffer may be an RGB index format or a YUV index format. The bit precision of the data format may not be 8 bits.

In the present embodiments, the composite image frame buffer 134 employs an 8-bit index format in which 255 colors and a transparent color can be used for an alpha-blended translucent composite image. However, the composite image frame buffer 134 can employ a data format using R, G, and B values having 8 bits each. Thus, about 16,000,000 colors can be used for translucent pixels, thus providing displays of higher quality.

As described above, the present invention allows the main image frame buffer 122 to be used as a reference in decoding, thus preventing deterioration of images. Conventionally, the image compressed in the MPEP mode is decoded by referring to next frame data and previous frame data. However, according to the present invention, the main image frame buffer 122 is not used for alpha blending but can be merely used for data reference.

Moreover, the present invention can relieve the burden on the frame buffer in the synthesizing process where a still image such as a movie or karaoke subtitle is synthesized with a moving image.

The reason is that the image synthesis and display 140 does not execute the alpha blending but merely executes the superimposing process, thus reducing its operational burden.

Moreover, the alpha-blending section 133 is sufficient for the size of the sub-image. Sub-images with small image size such as subtitles require a small amount of processing.

The alpha blending section 133 implements only the calculations for pixels of the sub-image so that the translucent calculation is not required for pixels of the composite image that do not correspond to pixels of the sub-image.

According to the present invention, the display does not require any special hardware. The reason is that the image synthesis and display 140 does not implement the alpha blending but implements only the superimposing process. As a result, the configuration of the present invention can be implemented on a personal computer.

The entire disclosure of Japanese Application No. 11-111587 filed Apr. 20, 1999 including specification, claims, drawing and summary are incorporated herein by reference in its entirely.

What is claimed is:

1. An image synthesizing system comprising:
   a main image decoder for decoding a compressed main image;
   a main image frame buffer for storing a decoded main image;
   a sub-image decoder for decoding a compressed sub-image to be applied to a portion of the main image in a translucent fashion, the sub-image being smaller than the main image;
   a sub-image frame buffer for storing a decoded sub-image;
   an alpha blending section for receiving said decoded sub-image from said sub-image buffer and receiving only a corresponding portion of said decoded main image that is smaller than the main image from said main image frame buffer, and alpha-blending said decoded sub-image and said corresponding portion of said main image to produce a translucent composite image that is smaller than the main image;
   a composite image frame buffer for storing said translucent composite image from said alpha blending section; and
   an image synthesis and display device for receiving said translucent composite image from said composite image frame buffer and said decoded main image from said main image frame buffer and superimposing said translucent composite image on said decoded main image.

2. The image synthesizing system defined in claim 1, wherein said main image and said sub-image are decoded before they are stored in said main image frame buffer and said sub-image frame buffer, said main image being compressed in an MPEG (Moving Picture coding Experts Group) mode, and said sub-image being compressed in a run-length mode.

3. The image synthesizing system defined in claim 1, wherein said alpha blending section executes an alpha blending process for a section of the main image that is the size of said sub-image.

4. The image synthesizing system defined in claim 1, wherein said alpha blending section alpha-blends each pixel of said sub-image with a corresponding pixel of said main image according to a ratio represented by the data of the pixel of the sub-image.

5. The image synthesizing system defined in claim 4, wherein said alpha blending section has a color table associating colors with index values, said alpha blending section representing each pixel of said composite image with an index value.

6. The image synthesizing system defined in claim 4, wherein said sub-image is a still image.

7. A method in an image synthesizing system for blending a sub-image with a main image, comprising:
   decoding a compressed main image;
   storing the decoded main image in a main image buffer;
   decoding a compressed sub-image that is to be applied to the main image in a translucent fashion, the sub-image being smaller than the main image;
   storing the decoded sub-image in a sub-image buffer;
   providing the decoded sub-image and only a corresponding portion of the decoded main image that is smaller than the main image to an alpha-blending section that is separate from the main image buffer;
   alpha-blending the decoded sub-image and the corresponding portion of the decoded main image in the alpha-blending section to produce a translucent composite image that is smaller than the main image;
   storing the translucent composite image in a composite image frame buffer;
   providing the translucent composite image from the composite image frame buffer to an image synthesis and display device and providing the decoded main image from the main image frame buffer to the image synthesis and display device; and
   superimposing the translucent composite image onto the decoded main image in the image synthesis and display device.

8. The method defined in claim 7, wherein the main image is compressed in accordance with an MPEG (Moving Picture coding Experts Group) format, and the sub-image is compressed in a run-length mode.

9. The method defined in claim 7, wherein the corresponding section of the main image is the same size as the sub-image.

10. The method defined in claim 7, wherein each pixel of said sub-image is alpha-blended with a corresponding pixel of the corresponding portion of the main image according to a ratio represented by the data of the pixel of the sub-image.

11. The method defined in claim 7, wherein each pixel of the translucent composite image is represented by an index value associated with a color in a color table.

12. The method defined in claim 7, wherein the sub-image is a still image.

\* \* \* \* \*